United States Patent
Jirskog

(10) Patent No.: US 7,895,889 B2
(45) Date of Patent: Mar. 1, 2011

(54) RADAR LEVEL GAUGE SYSTEM WITH ADAPTIVE TRANSMISSION POWER CONTROL

(75) Inventor: Anders Jirskog, Huskvarna (SE)

(73) Assignee: Rosemount Tank Radar AB, Gothenburg (SE)

( * ) Notice: Subject to any disclaimer, the term of this patent is extended or adjusted under 35 U.S.C. 154(b) by 624 days.

(21) Appl. No.: 11/807,984

(22) Filed: May 31, 2007

(65) Prior Publication Data

US 2008/0282793 A1 Nov. 20, 2008

(30) Foreign Application Priority Data

May 16, 2007 (SE) .................................... 0701228

(51) Int. Cl.
*G01F 23/28* (2006.01)

(52) U.S. Cl. ....................................................... 73/293

(58) Field of Classification Search .................... 73/292
See application file for complete search history.

(56) References Cited

U.S. PATENT DOCUMENTS

| | | | | |
|---|---|---|---|---|
| 5,734,346 | A | * | 3/1998 | Richardson et al. .......... 342/124 |
| 6,191,724 | B1 | * | 2/2001 | McEwan ...................... 342/21 |
| 2004/0004567 | A1 | | 1/2004 | Kroeger et al. ............... 342/109 |
| 2007/0101810 | A1 | | 5/2007 | Eriksson et al. ................ 73/290 |
| 2007/0188374 | A1 | | 8/2007 | Fehrenbach et al. .......... 342/124 |

FOREIGN PATENT DOCUMENTS

EP 1 785 699 A1 5/2007
WO WO 2007/062842 6/2007

OTHER PUBLICATIONS

International Search Report for PCT/SE2008/050573, dated Aug. 19, 2008.
Communication from corresponding European application Serial No. 08156278.7-1234, dated Jun. 19, 2009.

* cited by examiner

*Primary Examiner*—Hezron Williams
*Assistant Examiner*—Paul West
(74) *Attorney, Agent, or Firm*—Westman, Champlin & Kelly, P.A.

(57) ABSTRACT

A radar level gauge system, for determining a filling level of a product contained in a tank, the radar level gauge system comprising a transceiver including a signal generator for generating electromagnetic signals for transmission; a transmitter branch for transmitting the electromagnetic signals; and a receiver branch for receiving electromagnetic signals. The radar level gauge system further comprises a propagation device for allowing transmitted electromagnetic signals to propagate towards a surface of the product inside the tank, where signals are reflected, and for returning reflected electromagnetic signals back from the surface of the product; processing circuitry connected to the transceiver and configured to determine the filling level based on the reflected electromagnetic signals; power sensing circuitry connected to the transceiver and configured to determine a received power level of received electromagnetic signals; and power level adjusting circuitry provided on the transmitter branch of the transceiver, connected to the power determination circuitry, and configured to adjust a transmitted power level of the transmitted electromagnetic signals in response to the determined received power level of the reflected electromagnetic signals.

21 Claims, 3 Drawing Sheets

RADAR LEVEL GAUGE SYSTEM WITH ADAPTIVE TRANSMISSION POWER CONTROL

The present application is claims priority of Sweden patent application Serial No. 0701228-9, filed May 16, 2007, the content of which is hereby incorporated by reference in its entirety.

TECHNICAL FIELD OF THE INVENTION

The present invention relates to a radar level gauge system, for determining a filling level of a product.

TECHNICAL BACKGROUND

Radar level gauge systems are today in use in a variety of fields of application for accurate level determination, as well as for determination of other product parameters, such as temperature, flow etc. For determining the level of a product by means of a radar level gauge system, electromagnetic signals are transmitted and propagated, usually by means of an antenna, towards a surface of the product, where signals are reflected. The reflected signals are received by the radar level gauge system, and the distance between a reference position and the surface of the product is determined by comparing the transmitted signals with the reflected signals. Based on this distance, the filling level can be determined.

Especially in open or semi-open applications, such as open tanks, floating-roof tanks, reservoirs, or even rivers or lakes, the operation of a radar level gauge system is typically subject to government regulations in respect of such parameters as the frequency and power of the transmitted signals.

According to such existing and/or anticipated regulations, the transmission power should be limited to a certain level. According to other forms or aspects of such regulations, the average emitted power, over time or for a given number of sources of emission, may be limited to a certain level. In such average-power-based regulations, a higher peak power may be permitted so long as the spatial and/or temporal average is below the stipulated value.

At the same time, the quality-of-measurement, such as the accuracy with respect to distance, of the radar level gauge system should not be sacrificed to obtain this transmission power level.

Conventional radar level gauge systems are generally not well adapted to fulfilling transmission power related regulations while at the same time achieving a high quality-of-measurement level.

SUMMARY OF THE INVENTION

In view of the above-mentioned and other drawbacks of the prior art, a general object of the present invention is to provide an improved radar level gauge system, and in particular a radar level gauge system capable of combining a sufficiently low transmission power to comply with various regulations with a high quality-of-measurement, including measurement accuracy.

According to a first aspect of the present invention, these and other objects are achieved through a radar level gauge system, for determining a filling level of a product contained in a tank, the radar level gauge system comprising: a transceiver including: a signal generator for generating electromagnetic signals for transmission; a transmitter branch for transmitting the electromagnetic signals; and a receiver branch for receiving electromagnetic signals; a propagation device for allowing transmitted electromagnetic signals to propagate towards a surface of the product inside the tank, where signals are reflected, and for returning reflected electromagnetic signals back from the surface of the product; processing circuitry connected to the transceiver and configured to determine the filling level based on the reflected electromagnetic signals; power sensing circuitry connected to the transceiver and configured to determine a received power level of received electromagnetic signals; and power level adjusting circuitry provided on the transmitter branch of the transceiver, connected to the power determination circuitry, and configured to adjust a transmitted power level of the transmitted electromagnetic signals in response to the determined received power level of the reflected electromagnetic signals.

By "propagation device" should, in the context of the present application, be understood a device capable of propagating electromagnetic signals. The propagation device may be an antenna, such as a horn antenna, a rod antenna, a patch antenna, an array antenna etc. In some applications, such as so-called floating roof tanks, the antenna is often referred to as mode converter or mode generator.

The tank may be any container or vessel capable of containing a product, and may be metallic, or partly or completely non-metallic, open, semi-open, or closed.

The transmitter branch and the receiver branch may be physically separated, or may coincide. In the latter case, the transmitter and receiver branches may, for example, be implemented utilizing a so-called "leaky mixer".

The present invention is based upon the realization that the fulfillment of various regulations in respect of power transmitted by a radar level gauge system can be achieved, while maintaining a high quality-of-measurement, by distributing the transmitted power, in time and/or between individual radar level gauge systems comprised in an installation including a plurality of radar level gauge systems, which may, for example, be arranged to determine the filling level in different tanks, in such a way that the transmitted power "budget" is used where it is most useful. Furthermore, the present inventor has realized that such a distribution of power combined with a high quality-of-measurement is enabled by determining the relevant received power level received by the radar level gauge system, and then adjusting the transmitted power level such that the received power level does not exceed a level at which a sufficiently high quality measurement can be performed.

By doing this, the total power transmitted by the above-mentioned multi-radar level gauge system installation can be channeled from, for example, radar level gauge systems that have very favorable measurement conditions to radar level gauge systems that need to transmit more power to produce a high quality measurement. Alternatively, or in combination, the transmitted power level of a single radar level gauge system may vary over time depending on measurement conditions etc, so that the temporal average power transmitted by that particular radar level gauge system is kept below a certain, regulated value.

A further effect achieved through the present invention is that the power consumption of the radar level gauge system can be minimized, given a certain desired quality-of-measurement.

In an installation thereof, a radar level gauge system will typically, in addition to the electromagnetic signals reflected at the surface to be gauged, receive signals that have been reflected at various other locations, for example by fixed structures in the tank or other environment. To facilitate correct adjustment, or regulation of the transmitted power, the power sensing circuitry comprised in the radar level gauge system according to the present invention may therefore advantageously be configured to discriminate the reflected electromagnetic signals originating from reflection at the surface of the product to be gauged. In this way, the transmission power level can be adjusted based on the correct reflected signals.

The power level adjusting circuitry comprised in the radar level gauge system according to the present invention may comprise controllable amplifier circuitry and/or controllable attenuator circuitry provided on the transmitter branch of the transceiver.

Such controllable amplifier and/or attenuator circuitry includes various types of commercially available amplifiers and attenuators, as well as custom made amplifier/attenuator circuitry such as can be realized using one or several suitable transistors and passive components.

Regardless of by means of which specific circuits the power level adjusting circuitry is realized, the circuitry may advantageously be designed in such a way that the equivalent waveguide length thereof is substantially independent of the environmental conditions, such as temperature, and/or operating point, in respect of amplification and/or attenuation setting, of the power adjusting circuitry.

This may be achieved by designing the power level adjusting circuitry so that it has a small physical extension in relation to a wavelength of the transmitted/received electromagnetic signals. For example, the power level adjusting circuitry may advantageously be designed in such a way that an equivalent length of a transmission path of the electromagnetic signals therethrough is considerably shorter than the wavelength of the electromagnetic signals, such as shorter than half the wavelength of the electromagnetic signals. Consequently, the extension of the power level adjusting circuitry can be permitted to be larger for a larger wavelength of the electromagnetic signals. This minimum physical extension can, for example, be realized by not implementing various stub lines etc that are typically used for microwave circuits, and thereby trading optimum performance for a reduced variability of the equivalent waveguide length.

The "equivalent waveguide length" or equivalent length of transmission path, which is sometimes also referred to as "inner length", is a property that indicates how circuitry influences electromagnetic signals passing therethrough with respect to transmission parameters, such as reflection due to discontinuities in impedance along the route of the electromagnetic signals through the circuitry. The effect of the various reflections can be expressed as an equivalent length of a transmission path, or, in other words, an equivalent waveguide length, which is equivalent to a group delay of the electromagnetic signals. It should be noted that this does not necessarily mean that the circuitry in question is a waveguide or even includes a waveguide, but that it can be represented by a waveguide having a certain length when describing its impact on signals passing therethrough.

By keeping the equivalent waveguide length substantially constant and/or monitoring the changes in the equivalent waveguide length and compensating for these changes, an improved measurement accuracy can be achieved, since the distance between the surface to be gauged and a reference position typically depends on the equivalent waveguide length of the circuitry between the antenna and the terminal of the transceiver where a signal indicative of the distance is output.

According to one embodiment of the radar level gauge system according to the present invention, this "stabilization" of the equivalent waveguide length or equivalent length of transmission path may be achieved through the provision of a controllable attenuator for controllably attenuating the transmitted power level; a controllable amplifier for controllably amplifying the transmitted power level; and compensating circuitry configured to compensate for differences in the equivalent waveguide length of the power level adjusting circuitry.

According to a second aspect of the present invention, the above-mentioned and other objects are achieved through a method for adaptively controlling a transmitted power of a radar level gauge system comprising: a transceiver including: a signal generator for generating electromagnetic signals for transmission; a transmitter branch for transmitting the electromagnetic signals; and a receiver branch for receiving electromagnetic signals; a propagation device for allowing transmitted electromagnetic signals to propagate towards a surface of the product inside the tank, where signals are reflected, and for returning reflected electromagnetic signals back from the surface of the product; processing circuitry connected to the transceiver and configured to determine the filling level based on the (transmitted and) reflected electromagnetic signals, the method comprising the steps of: determining a received power level of the reflected electromagnetic signals; controlling a transmitted power level of the transmitted electromagnetic signals in such a way that the received power level is kept below a predetermined threshold value.

Various features and advantages of the present second aspect of the invention are largely analogous to those described above in connection with the first aspect of the present invention.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF A PREFERRED EMBODIMENT OF THE INVENTION

In the present description, embodiments of the present invention are mainly described with reference to a radar level gauge system having a horn antenna and being mounted on an open tank containing a product. It should be noted that this by no means limits the scope of the invention, which is equally applicable to radar level gauge systems implemented in other applications, open, semi-open as well as closed, such as for level determination in open tanks, floating roof tanks, reservoirs, rivers and other watercourses, etc.

Moreover, the radar level gauge system according to the present invention may be equipped with any other type of antenna, such as a patch antenna, a rod antenna or an array antenna.

Figure 1:
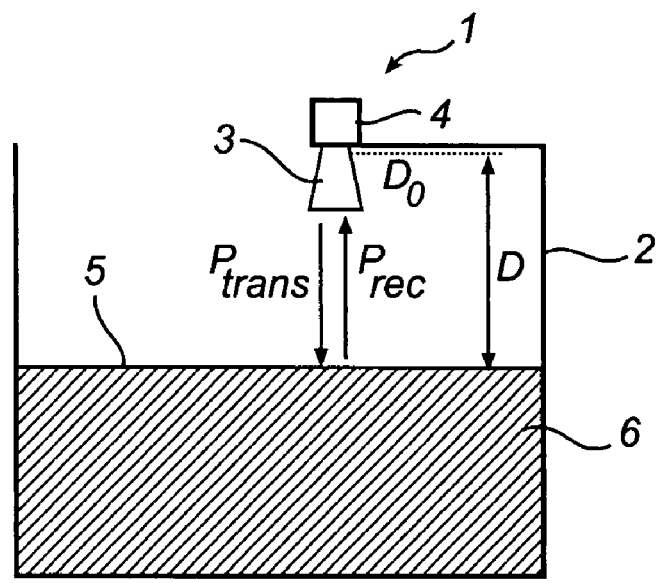
FIG. 1 is a schematic illustration of a radar level gauge system according to an embodiment of the invention.

In FIG. 1, a radar level gauge system 1 according to an embodiment of the present invention is schematically shown mounted on an open tank 2. The radar level gauge system 1 has a propagating device, here in the form of a horn antenna 3, and a control unit 4 including (although not shown in FIG. 1) a transceiver, power sensing circuitry, processing circuitry, and typically an interface for enabling communication with an external control station and/or other sensing devices, such as temperature and/or pressure sensing devices.

In order to determine the filling level of the product 6 contained in the tank 2, the distance D between a reference position $D_0$ and the surface 5 of the product 6 in the tank 2 is measured. This is done by transmitting electromagnetic signals which are allowed to propagate towards the surface 5 of the product 6, where a fraction of the power of the transmitted signals is reflected as reflected electromagnetic signals. These reflected electromagnetic signals are received by the antenna 3 and passed on to the transceiver.

The distance D is then determined by the processing circuitry in the control unit 4 by comparing the received reflected electromagnetic signals with the transmitted electromagnetic signals. This is typically done by mixing the reflected electromagnetic signals with signals indicative of the transmitted electromagnetic signals and analyzing the resulting interference signal.

For open tank applications in particular, the frequency and the transmitted power level $P_{trans}$ of the transmitted electromagnetic signals should comply with government regulations and relevant available and anticipated standards.

Figure 2:
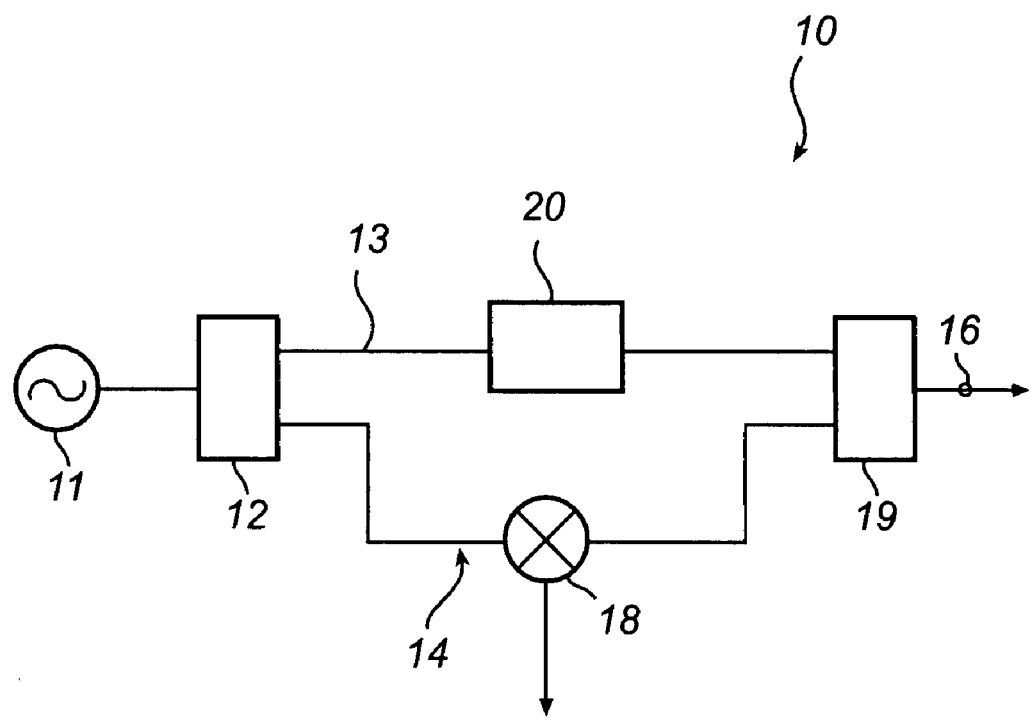
FIG. 2 is a schematic block diagram of a transceiver comprised in an embodiment of a radar level gauge system according to the present invention.

FIG. 2 schematically shows an exemplary transceiver 10 comprised in a radar level gauge according to an embodiment of the present invention.

In FIG. 2, the transceiver 10 is shown, having a signal generator 11 connected to power dividing circuitry, here in the form of a Wilkinson Power Divider (WPD) 12. After the WPD 12, the line is divided into a transmitter branch 13 and a receiver branch 14. The transmitter branch 13 and the receiver branch 14 are connected to a transceiver input/output terminal 16 via a second WPD 19. As for reflected electromagnetic signals picked up by the antenna 3, these signals are divided by the second WPD 19, and the fraction of the reflected signals going into the receiver branch are mixed with signals from the signal generator 11 in the mixer 18. The distance D to the surface 6 can then be determined based on the output from the mixer 18.

The transceiver further has power level adjusting circuitry 20 connected on the transmitter branch 13.

This power level adjusting circuitry 20 will be described further below with reference to FIG. 3.

Figure 3:
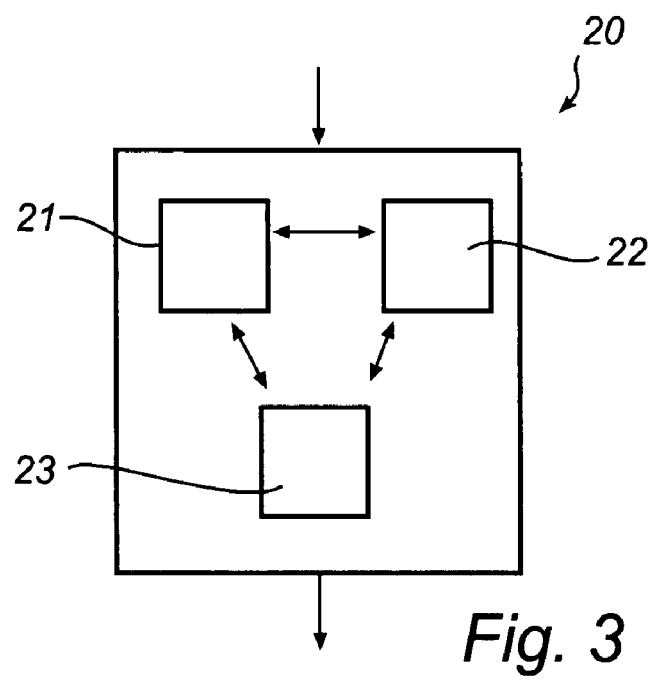
FIG. 3 is a schematic block diagram of power level adjusting circuitry comprised in the transceiver in FIG. 2.

As is schematically shown in FIG. 3, the power level adjusting circuitry 20 comprise a controllable amplifier 21, such as, for example, the component HMC463LH250 from Hittite Microwave Corporation, a controllable attenuator 22, such as, for example, HMC424LH5 and/or HMC346LP3/346LP3E, both from Hittite Microwave Corporation, and compensating circuitry 23 configured to compensate for differences in the equivalent waveguide length of the power level adjusting circuitry 20.

Figure 4:
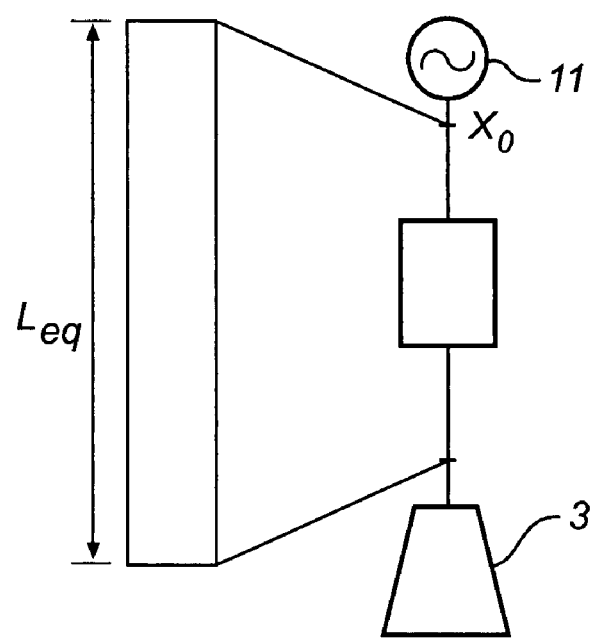
FIG. 4 schematically illustrates the concept of an equivalent waveguide length.

As is schematically illustrated in FIG. 4, the circuitry in a radar level gauge system between a reference position $x_0$ and the antenna 3 can, from a signal propagation point of view, be seen as a waveguide having an equivalent waveguide length $L_{eq}$. This equivalent waveguide length, or equivalent length of transmission path, can also be seen as a kind of accumulated voltage standing wave ratio VSWR of the system.

When this equivalent waveguide length, for any reason, is changed, the perceived distance to the surface 5 of the product 6 in the tank 2 (referring to FIG. 1) is also changed.

Figure 5:
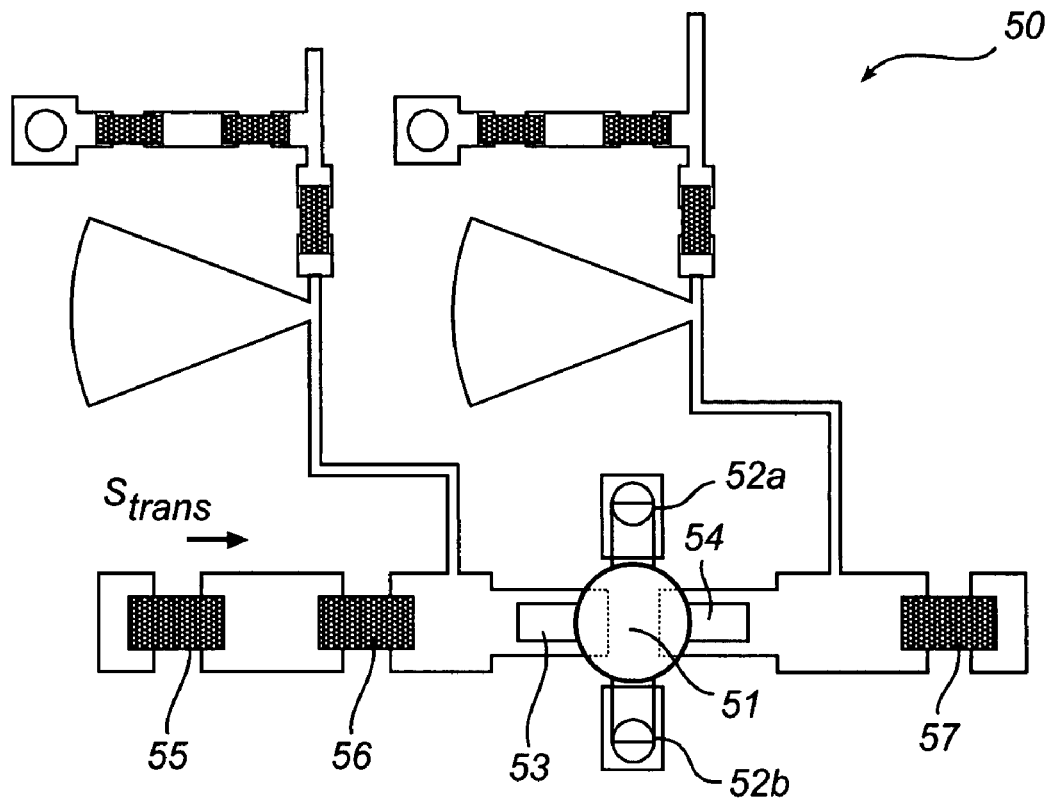
FIG. 5 is a schematic circuit layout for simple power level adjusting circuitry having a physical extension which is minimized in terms of the wavelength of the transmitted signals to reduce variations in the equivalent waveguide length thereof.

With reference to FIG. 5, simple power level adjusting circuitry, here in the form of a one-stage amplifier 50, which is designed to keep variations in the equivalent waveguide length thereof small, will now be described.

The one-stage amplifier 50 in FIG. 5 comprises an FET-transistor 51 having two source terminals 52$a$-$b$, which are connected to ground, a gate terminal 53 and a drain terminal 54. The transistor 51 is biased by applying desired voltages to the gate and drain terminals, 53, 54, respectively.

When implemented in the radar level gauge system according to the present invention, signals $S_{trans}$ to be transmitted are fed to the one-stage amplifier 50 from left in FIG. 5. The signals then first encounter a capacitor 55 for filtering out any DC-signals and are subsequently passed through a resistor 56 to the gate terminal 53 of the transistor 51. As a result thereof, adjusted signals (amplified or attenuated) will be present at the drain terminal 54 of the transistor 51. These adjusted signals for transmission, are then passed through an optional capacitor 57 (which is typically not included in the amplifier 50 when the antenna is directly connected on the right hand side thereof in FIG. 5).

As is evident from FIG. 5, the amplifier 50 shown therein is very compact along the signal propagation path, and does not have any stub lines or similar.

Additionally, the radar level gauge system may advantageously be configured to compensate for variations in equivalent waveguide length through hardware, software, or a combination thereof.

According to one example, such a compensation can be achieved by mapping the dependence of the equivalent waveguide length of the power level adjusting (or amplifying) circuitry on the operating temperature thereof. This dependence can, for example, be stored in a look-up table which can be used by the radar level gauge system to compensate for variations in equivalent waveguide length due to variations in temperature. Such a mapping can, of course, be made in respect of other relevant parameters as well, including for example the signal frequency and/or bandwidth.

The compensation may take place in software as a "final" adjustment, and/or the operating parameters of the power level adjusting circuitry can be adjusted in order to keep the equivalent waveguide length thereof substantially constant. If the power level adjusting circuitry is implemented as a transistor based amplifier, the equivalent waveguide length thereof may, for example, be altered by adjusting the bias, such as the drain-source voltage and gate-source voltage (in case field effect transistors are used).

Moreover, the impact of a variation in the equivalent waveguide length can be mitigated through the provision of an intentional discontinuity near the end of the "transmission chain" leading to the antenna 3. By means of such a discontinuity a reference echo signal can be obtained, which can be used for calibration of the system. Such an intentional reference discontinuity is especially useful for pulsed systems.

Figure 6:
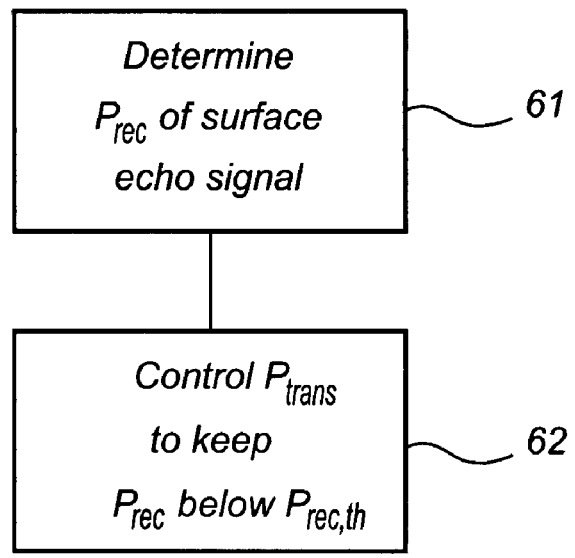
FIG. 6 is a flow chart schematically illustrating an embodiment of the power control method according to the present invention.

Referring now to FIG. 6, a method for adjusting the transmission power in a radar level gauge system, according to an embodiment of the present invention will be described.

In a first step, 61, a received power level $P_{rec}$ of the reflected electromagnetic signals is determined.

Depending on the measurement scheme utilized, the received power level $P_{rec}$ is typically determined in slightly different ways.

When frequency modulated continuous wave (FMCW) measurement is used, the received electromagnetic signals are typically analog-to-digital (A/D) converted and then subjected to fast fourier transform (FFT) processing, yielding the power of the different "echo" signals received.

In the case of pulsed systems, generally, no FFT processing is required.

When the power levels of the received signals, which typically form a kind of "echo train", are known, the relevant received signals, resulting from reflection at the surface 5 of the product 6 to be gauged, are discriminated from the rest of the received signals.

Such discrimination is typically made in software using various more or less elaborate selection criteria. For example, the strongest received echo signal, and/or the first received echo signal may be evaluated. Typically, the entire tank is scanned at an initial stage, and, based on the result of the scan, the correct echo signals (the electromagnetic signals that have been reflected at the surface 5 of the product 6) can be selected. In subsequent measurements, the correct echo signals can be focused on, and not further scan is necessary.

In the next and final step 62, the transmitted power level $P_{trans}$ is controlled to keep the received power level $P_{rec}$ determined in step 51 below a predetermined threshold level $P_{rec, th}$.

The person skilled in the art realizes that the present invention by no means is limited to the preferred embodiments described above. For example, the transceiver may include more than one signal generator, such as one transmitter oscillator for the transmitter branch, and one receiver oscillator for the receiver branch.

What is claimed is:

1. A radar level gauge system, for determining a filling level of a product contained in a tank, said radar level gauge system comprising:
    a transceiver including:
        a signal generator for generating electromagnetic signals for transmission;
        a transmitter branch for transmitting said electromagnetic signals; and
        a receiver branch for receiving electromagnetic signals;
    said radar level gauge system further comprising a propagation device for allowing transmitted electromagnetic signals to propagate towards a surface of said product inside the tank, where signals are reflected, and for returning reflected electromagnetic signals back from said surface of the product;
    processing circuitry connected to said transceiver and configured to determine said filling level based on said reflected electromagnetic signals;
    power sensing circuitry connected to said transceiver and configured to determine a received power level of received electromagnetic signals; and
    power level adjusting circuitry provided on said transmitter branch of the transceiver, connected to said power sensing circuitry, and configured to adjust a transmitted power level of said transmitted electromagnetic signals in response to said determined received power level of the reflected electromagnetic signals,
    wherein said power level adjusting circuitry is configured to adjust said transmitted power level in such a way that said received power level is kept below a predetermined threshold value,
    said predetermined threshold value being selected to keep a temporal average power transmitted by the radar level gauge system below a predetermined power level.

2. The radar level gauge system according to claim 1, wherein said power sensing circuitry is further configured to discriminate said reflected electromagnetic signals, having been reflected at said surface of the product, and to determine a corresponding received power level.

3. The radar level gauge system according to claim 1, wherein said predetermined threshold value is −60 dBm.

4. The radar level gauge system according to claim 1, wherein said power level adjusting circuitry is adapted to keep an equivalent waveguide length thereof substantially independent of environmental conditions and/or operating point of said power level adjusting circuitry.

5. The radar level gauge system according to claim 4, wherein said power level adjusting circuitry comprises:
    a controllable attenuator for controllably attenuating said transmitted power level;
    a controllable amplifier for controllably amplifying said transmitted power level; and
    compensating circuitry configured to compensate for differences in said equivalent waveguide length of said power level adjusting circuitry.

6. The radar level gauge system according to claim 4, wherein said power level adjusting circuitry is configured in such a way that it has such a small physical extension that an equivalent length of a transmission path of said electromagnetic signals through said power level adjusting circuitry is shorter than said wavelength of the electromagnetic signals.

7. The radar level gauge system according to claim 1, further comprising temperature sensing circuitry for indicating an operating temperature of said power level adjusting circuitry.

8. The radar level gauge system according to claim 7, wherein said radar level gauge system is adapted to control operating conditions of said power level adjusting circuitry in response to said indicated operating temperature, in order to keep an equivalent waveguide length thereof substantially independent of operating temperature.

9. The radar level gauge system according to claim 1, wherein said processing circuitry is configured to adjust said determined filling level based on settings of said power level adjusting circuitry and/or environmental conditions, to compensate for differences in an equivalent waveguide length of said power level adjusting circuitry.

10. The radar level gauge system according to claim 1, further comprising a mixer for mixing said received electromagnetic signals with signals indicative of said transmitted electromagnetic signals, to thereby enable determination of said filling level based on a difference between said received and transmitted electromagnetic signals.

11. The radar level gauge system according to claim 1, wherein a total power of said transmitted signals, following power level adjustment, is below −41.3 dBm.

12. The radar level gauge system according to claim 11, wherein said total power of said transmitted signals, following power level adjustment, is below −46 dBm.

13. The radar level gauge system according to claim 12, wherein said total power of said transmitted signals, following power level adjustment, is below −50 dBm.

14. A method for adaptively controlling a transmitted power of a radar level gauge system comprising:
    a transceiver including:
        a signal generator for generating electromagnetic signals for transmission;
        a transmitter branch for transmitting said electromagnetic signals; and
    a receiver branch for receiving electromagnetic signals;

a propagation device for allowing transmitted electromagnetic signals to propagate towards a surface of said product inside the tank, where signals are reflected, and for returning reflected electromagnetic signals back from said surface of the product;

processing circuitry connected to said transceiver and configured to determine said filling level based on said (transmitted and) reflected electromagnetic signals, said method comprising the steps of:

determining a received power level of said reflected electromagnetic signals;

controlling a transmitted power level of said transmitted electromagnetic signals in such a way that said received power level is kept below a predetermined threshold value, said predetermined threshold value being selected to keep a temporal average power transmitted by the radar level gauge system below a predetermined power level.

15. The method according to claim 14, further comprising the step of:

discriminating said returned electromagnetic signals, having been reflected at said surface of the product.

16. The method according to claim 14, further comprising the step of:

adjusting signal propagation properties of said radar level gauge system to keep an equivalent waveguide length of said transmitter branch substantially constant.

17. A multi-radar level gauge system comprising a plurality of radar level gauge systems for determining a filling level of a product contained in a tank, each of said radar level gauge system comprising:

a transceiver including:
a signal generator for generating electromagnetic signals for transmission;
a transmitter branch for transmitting said electromagnetic signals; and
a receiver branch for receiving electromagnetic signals;

said radar level gauge system further comprising a propagation device for allowing transmitted electromagnetic signals to propagate towards a surface of said product inside the tank, where signals are reflected, and for returning reflected electromagnetic signals back from said surface of the product;

processing circuitry connected to said transceiver and configured to determine said filling level based on said reflected electromagnetic signals;

power sensing circuitry connected to said transceiver and configured to determine a received power level of received electromagnetic signals; and power level adjusting circuitry provided on said transmitter branch of the transceiver, connected to said power determination circuitry, and configured to adjust a transmitted power level of said transmitted electromagnetic signals in response to said determined received power level of the reflected electromagnetic signals, wherein said power level adjusting circuitry is configured to adjust said transmitted power level in such a way that said received power level is kept below a predetermined threshold value, said predetermined threshold value being selected to keep a total power transmitted by the multi-radar level gauge system below a predetermined power level.

18. A radar level gauge system, for determining a filling level of a product contained in a tank, said radar level gauge system comprising:

a transceiver including:
a signal generator for generating electromagnetic signals for transmission;
a transmitter branch for transmitting said electromagnetic signals; and
a receiver branch for receiving electromagnetic signals;

said radar level gauge system further comprising a propagation device for allowing transmitted electromagnetic signals to propagate towards a surface of said product inside the tank, where signals are reflected, and for returning reflected electromagnetic signals back from said surface of the product;

processing circuitry connected to said transceiver and configured to determine said filling level based on said reflected electromagnetic signals;

power sensing circuitry connected to said transceiver and configured to determine a received power level of received electromagnetic signals; and power level adjusting circuitry provided on said transmitter branch of the transceiver, connected to said power sensing circuitry, and configured to adjust a transmitted power level of said transmitted electromagnetic signals in response to said determined received power level of the reflected electromagnetic signals, wherein said power level adjusting circuitry is adapted to keep an equivalent waveguide length thereof substantially independent of environmental conditions and/or operating point of said power level adjusting circuitry, and wherein said power level adjusting circuitry comprises:

a controllable attenuator for controllably attenuating said transmitted power level;

a controllable amplifier for controllably amplifying said transmitted power level; and compensating circuitry configured to compensate for differences in said equivalent waveguide length of said power level adjusting circuitry.

19. A radar level gauge system, for determining a filling level of a product contained in a tank, said radar level gauge system comprising:

a transceiver including:
a signal generator for generating electromagnetic signals for transmission;
a transmitter branch for transmitting said electromagnetic signals; and
a receiver branch for receiving electromagnetic signals;

said radar level gauge system further comprising a propagation device for allowing transmitted electromagnetic signals to propagate towards a surface of said product inside the tank, where signals are reflected, and for returning reflected electromagnetic signals back from said surface of the product;

processing circuitry connected to said transceiver and configured to determine said filling level based on said reflected electromagnetic signals;

power sensing circuitry connected to said transceiver and configured to determine a received power level of received electromagnetic signals; and power level adjusting circuitry provided on said transmitter branch of the transceiver, connected to said power sensing circuitry, and configured to adjust a transmitted power level of said transmitted electromagnetic signals in response to said determined received power level of the reflected electromagnetic signals, wherein said power level adjusting circuitry is adapted to keep an equivalent waveguide length thereof substantially independent of environmental conditions and/or operating point of said power level adjusting circuitry, and wherein said power level adjusting circuitry is configured in such a way that it has such a small physical extension that an equivalent length of a transmission path of said electromagnetic signals through said power level adjusting circuitry is shorter than said wavelength of the electromagnetic signals.

20. A radar level gauge system, for determining a filling level of a product contained in a tank, said radar level gauge system comprising:

a transceiver including:
- a signal generator for generating electromagnetic signals for transmission;
- a transmitter branch for transmitting said electromagnetic signals; and
- a receiver branch for receiving electromagnetic signals;

said radar level gauge system further comprising a propagation device for allowing transmitted electromagnetic signals to propagate towards a surface of said product inside the tank, where signals are reflected, and for returning reflected electromagnetic signals back from said surface of the product;

processing circuitry connected to said transceiver and configured to determine said filling level based on said reflected electromagnetic signals;

power sensing circuitry connected to said transceiver and configured to determine a received power level of received electromagnetic signals; and power level adjusting circuitry provided on said transmitter branch of the transceiver, connected to said power sensing circuitry, and configured to adjust a transmitted power level of said transmitted electromagnetic signals in response to said determined received power level of the reflected electromagnetic signals, said radar level gauge system further comprising temperature sensing circuitry for indicating an operating temperature of said power level adjusting circuitry, wherein said radar level gauge system is adapted to control operating conditions of said power level adjusting circuitry in response to said indicated operating temperature, in order to keep an equivalent waveguide length thereof substantially independent of operating temperature.

21. A radar level gauge system, for determining a filling level of a product contained in a tank, said radar level gauge system comprising:

a transceiver including:
- a signal generator for generating electromagnetic signals for transmission;
- a transmitter branch for transmitting said electromagnetic signals; and
- a receiver branch for receiving electromagnetic signals;

said radar level gauge system further comprising a propagation device for allowing transmitted electromagnetic signals to propagate towards a surface of said product inside the tank, where signals are reflected, and for returning reflected electromagnetic signals back from said surface of the product;

processing circuitry connected to said transceiver and configured to determine said filling level based on said reflected electromagnetic signals;

power sensing circuitry connected to said transceiver and configured to determine a received power level of received electromagnetic signals; and power level adjusting circuitry provided on said transmitter branch of the transceiver, connected to said power sensing circuitry, and configured to adjust a transmitted power level of said transmitted electromagnetic signals in response to said determined received power level of the reflected electromagnetic signals, said radar level gauge system further comprising a mixer for mixing said received electromagnetic signals with signals indicative of said transmitted electromagnetic signals, to thereby enable determination of said filling level based on a difference between said received and transmitted electromagnetic signals.

* * * * *